United States Patent [19]

Johnson

[11] 3,821,365

[45] June 28, 1974

[54] ACCELERATING THE LYSIS OF BLOOD CLOTS

[75] Inventor: Robert Phillip Johnson, Alma, Mich.

[73] Assignee: Abbott Laboratories, North Chicago, Ill.

[22] Filed: Feb. 26, 1973

[21] Appl. No.: 336,096

Related U.S. Application Data

[63] Continuation-in-part of Ser. No. 234,373, March 13, 1972, abandoned.

[52] U.S. Cl. .................................. 424/94, 424/303
[51] Int. Cl. ..................... A61k 19/00, A61k 27/00
[58] Field of Search ............................. 424/94, 303

[56] References Cited
UNITED STATES PATENTS

| | | | |
|---|---|---|---|
| 3,037,042 | 5/1962 | Laemmle | 260/458 |
| 3,133,950 | 4/1964 | Pizzarello | 260/458 |
| 3,294,641 | 12/1966 | Lorand | 424/94 |
| 3,636,201 | 1/1972 | Johnson | 424/94 |

OTHER PUBLICATIONS

Goldstein et al., Chemical Abstracts, Vol. 60, p. 15,734(f), (1964).

Zajac et al., Chemical Abstracts, Vol. 62, p. 4,594(d), (1965).

*Primary Examiner*—Albert T. Meyers
*Assistant Examiner*—Norman A. Drezin
*Attorney, Agent, or Firm*—Paul D. Burgauer; Robert L. Niblack

[57] ABSTRACT

1-Aminoethyl-2-sulfate ester and the corresponding C-alkyl and/or N-alkyl substituted analogs have been found to potentiate blood clot lysis induced by urokinase when a combination of urokinase and one of these sulfate esters is brought in contact with clots of blood from vertebrate animals.

11 Claims, No Drawings

ACCELERATING THE LYSIS OF BLOOD CLOTS

HISTORY OF THE INVENTION

The present application is a continuation-in-part of U.S. Ser. No. 234,373, filed on Mar. 13, 1972, now abandoned.

DETAILED DESCRIPTION OF THE INVENTION

This invention relates to novel compositions involving the combination of urokinase and certain 1-aminoethyl-2-sulfate esters and to the method of employing such a combination in order to accelerate the lysis of blood clots.

Urokinase is a complex protein of unknown structure which is found in human urine in trace amounts. It is an effective blood clot lysing agent but only when injected in amounts far greater than those which exist naturally in body fluids. Methods of recovering urokinase from human urine are known, but because urokinase is present there only in minute amounts, its isolation from urine is extremely expensive. Furthermore, because relatively large amounts of urokinase are needed for the dissolution of a blood clot with this agent, the discovery of this activity for urokinase is only of research interest and has little practical value, unless agents are found which can be employed in conjunction with urokinase in order to speed up the lysing process and reduce the amount of urokinase required to dissolve a blood clot.

For the purpose of the present invention, the term "urokinase" is meant to include that component or those components present in the blood vessels of vertebrates which exhibit the clot-lysing effect commonly ascribed to urokinase. Such components, whether similar in structure or totally different from urokinase, are thus to be understood as being included in the term "urokinase."

It is an object of the present invention to provide novel compositions which, when brought into contact with a vertebrate blood clot, will cause more or faster lysis of a blood clot than by using urokinase alone for this purpose. Another object of this invention is to provide a method of employing the novel compositions herein disclosed which will decrease the cost and time needed to dissolve a blood clot. A further object is the process of lysing a blood clot by softening such a clot prior to treating it with urokinase. A still further object of this invention is the provision of a two-step treatment method for warm-blooded animals suffering from clot obstructions in their blood stream.

These and other objects are accomplished by providing a combination comprising urokinase and an ester of the formula

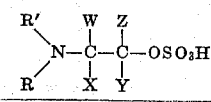

wherein, R, R', W, X, Y and Z independently are hydrogen or methyl, and wherein X and Y together may form a linear propylene chain, and a method for treating a vertebrate blood clot with urokinase and said ester. The above ester may enhance the effect of urokinase on a blood clot by softening the clot and making it easier for urokinase to act thereon and promoting lysis of the clot in a much shorter period of time, or it may affect an inhibitor of the urokinase activity in the blood. The empirical fact is that the amount of urokinase required for clot lysing is drastically reduced when combined with one of the above esters. The dramatic effect obtained by the disclosed combination of reagents can be demonstrated both in vitro and in vivo.

The exact amount of the above ester that is used as potentiator per unit of urokinase is not critical; good results are obtained when 0.04 – 5.0 micromoles of said ester are employed per CTA unit of urokinase activity. (One CTA unit is the standard unit of urokinase activity established by the National Heart Institute Committe on Thrombolytic Agents; Fletcher et al., J. Lab. Clin. Med. 65, 713–31, May, 1965). A preferred and practical range within the above limits comprises between 0.1 and 1.0 micromoles of said ester per CTA unit. The combination of these agents may be employed as such or the blood clot can be treated first with a solution of one of the above esters and then with urokinase, optionally followed with additional doses of ester solution.

The invention is more clearly understood by reference to the following examples which show the surprising and unexpected results obtained with the new compositions. These examples, however, are illustrations only and are not to be construed as restrictive.

EXAMPLES 1–5

The experiment to determine the activity of the new composition was carried out as follows: human fibrinogen labeled with radioactive iodine $I^{125}$ was prepared by the method of Rosa, et al., Biochim. Biophys. Acta 86, 519 (1964). A solution of this fibrinogen was added to human plasma obtained by known methods. The well-stirred mixture was divided into 1.0 ml. aliquots in test tubes. The labeled fibrinogen was converted to fibrin clots by adding thrombin to each tube and immediately spinning a ground glass rod in each mixture for 15 seconds. The formed clots adhered to the glass rods. An amount of fibrinogen is chosen so that the clot attached to the glass rod contains approximately 10,000 counts per minute of radioactivity. The clots were aged overnight in the refrigerator by remaining in the solution from which it was formed. The next day the clots were wound tightly on the rods thereby expelling the serum. The clots are then stored frozen in the solution from which they were formed until needed.

To 1.5 ml. of human blood plasma in a test tube is added 1.5 mg. of the aminoalkylsulfate ester to be tested. To this solution is added 0.1 ml. of urokinase solution of a concentration that from previous experience is known to produce by itself only a small amount of lysis (about 10 percent). After mixing, a glass rod with an attached $I^{125}$ labeled clot is placed in the mixture and incubated with gentle shaking for 20 hours at 37° C. Appropriate control tubes are also incubated. These include: (a) radioactive background (1.5 ml. plasma + 0.1 ml. urokinase vehicle containing 0.5 percent fraction V human serum albumin and 0.1 percent of the disodium salt of edetic acid in isotonic saline); (b) tubes to determine percent leaching (rod with vehicle); and (c) tubes to determine percent lysis produced by urokinase alone (rod with attached $I^{125}$ clot in 1.5 ml. plasma + 0.1 ml. urokinase solution). After incubation, the clot rods are removed from their respective tubes and placed in tubes containing 1.5 ml. 10 percent sodium hydroxide. They are allowed to stand in this sodium hydroxide solution at room temperature for 30 minutes during which time any portion of the clot that was not lysed off the rod during the incubation is completely dissolved. Control radioactive background tubes for these contain 1.5 ml. sodium hydroxide. The sum of the radioactivity present in the sodium hydroxide and in the incubation tube represents the total radioactivity originally present in a particular clot. After correcting for the amount of radioactivity that is simply leached out during the incubation (control tubes b) and for radioactive background, the present lysis produced by the urokinase or urokinase + drug is calculated.

The esters with which the present invention is concerned were tested at the same time and in each case, 35 CTA units of urokinase were added to each tube. Urokinase without added sulfate ester produced 11 percent lysis.

TABLE I

| Example Number | Compound I | | | | | | % Lysis |
|---|---|---|---|---|---|---|---|
| | R | R' | W | X | Y | Z | |
| 1 | H | H | H | H | H | H | 30% |
| 2 | Me | H | H | H | H | H | 21% |
| 3 | Me | Me | H | H | H | H | 17% |
| 4 | H | H | H | H | H | Me | 35% |
| 5 | Me | Me | H | H | H | Me | 17% |

The toxicities of the above compounds are extremely low, in fact, with the compound of Example 1 at an intravenous dose of 2 g./kg., no death occurred in a test with 10 mice and the compound of Example 4 showed an intravenous $LD_{50}$ of 7.9 g./kg. The compound of Example 2 produced no death in 3 mice at an intraperitoneal dose of 1 g./kg. The remaining compounds were equally untoxic and all described compounds showed intraperitoneal $LD_{50}$ values in excess of 1 g./kg.

EXAMPLES 6–10

In a repetition of the above procedure, other substituted aminoethylsulfate esters of formula I were tested but in this instance, the urokinase present (40 units) produced a value of 20 percent lysis in the absence of test drug. The values established with added test drug were as follows:

TABLE II

| Example Number | R | R' | W | X | Y | Z | % Lysis |
|---|---|---|---|---|---|---|---|
| 6 | H | H | Me | H | H | H | 24% |
| 7 | H | H | Me | Me | H | H | 24% |
| 8 | a)H | H | Me | H | Me | H | 26% |
| 9 | b)H | H | Me | H | Me | H | 23% |
| 10 | H | H | H | -(CH$_2$)$_3$- | | H | 30% | a) erythro-form
b) threo-form

Retesting of the compound of Example 1 in the presence of 40 units of urokinase as above showed 37 percent lysis. The compounds of Table II were similarly nontoxic as those described in Examples 1–5: in intraperitoneal tests, no deaths occurred with any of the described compounds in mice in doses of 1 g./kg. The intravenous toxicities are equally low; for instance, the compound of Example 6 was tolerated in 10 mice out of 10 at a 1 g./kg. level.

EXAMPLE 11

For these in vivo tests, single blood clots were produced in the right jugular vein of the dogs by passing an electric current across the isolated vein through a pair of electrodes (Fedor, Buckner, Martin and Hajek; Fed. Proc. 26, 320 of 1967). For each dog, the total plasma volume was determined by the Evans Blue dye dilution method and the critical urokinase levels were determined by the method of Tsapogas and Flute (Brit. Med. Bull., 20, 223 of 1964). Approximately 2 ½ hours after the jugular was completely occluded as indicated by a blood flow of zero, injections of the sulfate ester and/or urokinase were started. All dogs were unanesthetized during the injection period except for the dog in test d).

a. Male beagle; weight 8.1 kg.: A 10 percent aqueous solution of 2-aminoethylsulfate ester (compound of Example 1) was injected intravenously every hour at 2 mg./ml. plasma (total dose 1,064 mg. or or 131 mg./kg. per injection) for a total of four injections. One half of the critical dose of unokinase (=53,200 CTA units) was injected intravenously each time 5 minutes after the drug injection (at 5, 65, 125 and 185 minutes). The blood flow in the previously completely occluded jugular was restored to 35 percent of its initial flow rate within 24 hours. One week later, blood flow was 100 percent restored.

b. Male beagle; weight 9.6 kg.: The drug administration schedule was identical to the above (total dose 1,210 mg. or 126 mg./kg. per injection) and urokinase was given at the level of 60,500 CTA units each time (one-half of critical dose) with the same solution concentrations as above. After 24 hours, blood flow was restored to 55 percent of its normal level and after 1 week, 100 percent of the initial flow was restored.

c. Male beagle; weight 9.0 kg.: A 10 percent aqueous solution of the above ester was injected intravenously every 30 minutes at a level of 147 mg./kg. (total dose: 1,326 mg. per injection) for a total of 7 doses. In each instance, the drug injection was followed within 5 minutes by an intravenous injection of 66,300 CTA units of urokinase (one half the critical dose). Within 1 week, blood flow increased from 0 to 95 percent of the initial flow rate.

d. Female beagle; weight 7.8 kg.: This dog was anesthetized with sodium pentobarbital. The injection schedule was the same as in a) above (109 mg./kg. drug dose and 52,185 CTA units of urokinase per injection). Within 1 week, the blood flow was restored to 27 percent of the initial rate.

e. Female beagle; weight 7.7 kg.: The injection schedule was the same as in a) above but different dose levels were used. Each injection of test drug contained 872 mg. (=113 mg./kg.) and 22,890 CTA units of urokinase. Within 1 week, the flow rate was restored to 89 percent of the initial level.

In two similar dogs (weights 7.6 kg. and 6.7 kg. respectively, both female) urokinase was given alone at 1 hour intervals at one half and four times the established critical (39,878 and 455,000 CTA units, respectively) dose for a total of four injections. After 24 hours as well as after 1 week, the jugular flow was zero in both dogs.

f. Male beagle; weight 10.7 kg.: An initial dose of the above ester as in 10 percent aqueous solution in the amount of 2 mg./ml. of plasma (total dose 1302 mg. or 122 mg./kg. of body weight) was administered intravenously followed, after 5 minutes, with a dose of 81,375 CTA units of urokinase one-half of the critical dose) as a solution containing 40,000 CTA units/ml. Five minutes after this administration, a continuous intravenous injection of the above 2-aminoethylsulfate ester was started with a 3.26 percent aqueous solution (2 mg./ml. plasma/hour or 1,302 mg. per hour) at a rate of 40 mg./hour and continued for 2 hours 50 minutes. Urokinase was injected in the above dose at 60 minutes intervals starting 1 hour after the start of the test. After 24 hours, blood flow in the previously completely occluded jugular was restored to 100 percent of its value before clot formation. After one week the flow was still 100 percent.

g. Female beagle; weight 10.4 kg.: A 10 percent aqueous solution of the compound of Example 6 was injected intravenously every hour at 2 mg./ml. of plasma. (Total dose b 5848 mg. or 141 mg./kg. per injection for a total of four injections.) One-half of the critical dose of urokinase (=63,597 CTA units) was injected intravenously each time 5 minutes after the drug injection (at 5, 65, 125, 185 minutes). The blood flow in the previously occluded jugular vein was restored to 59 percent of its initial flow rate within one hour after the final injection and 24 hours later, the blood flow was still 26 percent of the initial level.

The above experiments clearly show the excellent potentiation of the lysing effect of urokinase with the described aminoalkylsulfate esters of formula I. Urokinase is actually used in extremely small amounts and only relatively small amounts of the new potentiator are required for the desired clot lysing effect. It will be readily understood by those skilled in the art that quantities of urokinase much smaller than those mentioned above may be employed since an activator (acting as urokinase) is already present in the blood vessels of animals. The above examples also show that the fibrinolytic activity is enhanced in the in vivo system for which the new composition is designed: the blood clots used in above Examples 1–10 are basically identical to those formed in the blood of warm-blooded animals.

For treatment of a clot actually present in the blood vessel of a warm-blooded animal, the composition of this invention is administered intravenously or the individual components are administered separately. The process of the present invention can be carried out in several ways. For instance, the enhancer can be administered together with urokinase or it can be administered prior to the administration of urokinase and, if desired, may be followed by subsequent doses of the enhancer by parenteral and/or oral administration. In animals, an excellent treatment schedule is as follows: the selected aminoalkylsulfate ester is administered intravenously or orally after establishing that a clot is present in the blood stream. Subsequently or simultaneously, one-half the usual dose of urokinase or less is administered intravenously, and if desired, or indicated, these injection pairs are repeated several times at intervals of 30–60 minutes or on subsequent days. In some instances, further treatment with the enhancer alone for instance, by infusion extended over a period of several days produces excellent results, particularly where the urokinase is in short supply.

The sulfate esters used in the present invention were prepared by the method of Dewey et al., J. Org. Chem., 30, 491 (1965) and/or the method described by Cherbuliez et al., Helv. Chem. Acta, 47 (7), 2106 (1964).

For a practical dosage form, urokinase and the above enhancer may be combined for an injectable solution or the enhancer is provided separately as a tablet using the usual excipients, including release retardants. In a unit dosage form of this kind, the ratio between the enhancer and urokinase is best selected in a ratio of between 0.1 and 0.5 micromoles of the sulfate ester per CTA unit of urokinase. Injectable solutions are preferably adjusted to a pH of 7 or slightly above with tri(hydroxymethyl)aminoethane or a similar nontoxic, pharmaceutically acceptable buffer. The newly described potentiating compounds are of particular value because of their extremely low toxicity, and their exceptionally good water solubility which makes it unnecessary to convert them into acid addition salts.

The finding of the urokinase enhancing properties of the above sulfate esters of Formula I is an unusual discovery because this activity is exhibited only with the above molecules. Surprisingly, almost any modification made on the above molecules reduces their activity to such a degree that such secondary compounds would be less useful in a medicinal sense. For instance, the activity of the compound of Example 1 is reduced to 12.9 percent lysis when the β-carbon is ethylated and to 3 percent lysis respectively, if the carbon chain between the functional groups is extended to three or four.

We claim:

1. The method of enhancing the lysis of a blood clot in vertebrates which comprises contacting said clot with urokinase in an amount which produces about 10 to 20 percent lysis and an aminoethylsulfate ester of the formula

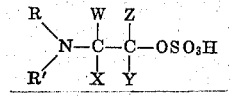

wherein R, R', W, X, Y and Z independently are methyl or hydrogen and wherein X and Y together may form a linear propylene chain, wherein 0.04 – 5.0 micromoles of said ester per CTA unit of urokinase activity is employed.

2. The method of claim 1 wherein, R, R', W, X, Y and Z all are hydrogen.

3. The method of claim 1 wherein R, R', W, Y and Z are hydrogen and X is methyl.

4. The method of claim 1 wherein R, R', W and Z are hydrogen and wherein X and Y together form a linear propylene chain.

5. The process of claim 1 wherein said blood clot is first contacted with said aminoethylsulfate ester and subsequently with urokinase.

6. The process of claim 5 wherein said aminoethylsulfate ester is 2-aminopropyl-1-sulfate ester.

7. The process of claim 5 wherein said aminoethylsulfate ester is the 1-aminocyclopentyl-2-sulfate ester.

8. The process of claim 5 wherein said aminoethylsulfate ester is the unsubstituted 2-aminoethylsulfate ester.

9. The process of claim 1 wherein said vertebrate is treated systemically with said 2-aminoethylsulfate ester.

10. A composition for accelerating the lysis of a vertebrate blood clot consisting essentially of urokinase and an aminoethylsulfate ester of the formula

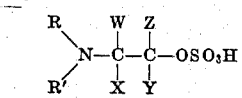

wherein R, R', W, X, Y and Z independently are methyl or hydrogen and wherein X and Y together may form a linear propylene chain, in which 0.04 – 5.0 micromoles of said ester per CTA unit of urokinase activity is present.

11. The composition of claim 10 in unit dosage form together with a pharmaceutically acceptable carrier.

* * * * *